(12) United States Patent
Yoshimura

(10) Patent No.: US 11,003,411 B2
(45) Date of Patent: May 11, 2021

(54) IMAGE DISPLAY SYSTEM, IMAGE DISPLAY DEVICE AND METHOD OF CONTROLLING IMAGE DISPLAY SYSTEM

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/285,568

(22) Filed: Feb. 26, 2019

(65) Prior Publication Data

US 2019/0265942 A1 Aug. 29, 2019

(30) Foreign Application Priority Data

Feb. 27, 2018 (JP) .............................. JP2018-032898

(51) Int. Cl.
*G06F 3/14* (2006.01)
*G02B 27/01* (2006.01)
*H04N 9/31* (2006.01)

(52) U.S. Cl.
CPC ......... *G06F 3/1462* (2013.01); *G02B 27/017* (2013.01); *G06F 3/1415* (2013.01); *G06F 3/1423* (2013.01); *H04N 9/3147* (2013.01); *G02B 2027/0178* (2013.01)

(58) Field of Classification Search
CPC ... G06F 3/1462; G06F 3/1415; G02B 27/017; G02B 2027/0178; H04N 9/3147
See application file for complete search history.

(56) References Cited

U.S. PATENT DOCUMENTS

| 2002/0071033 | A1* | 6/2002 | Gutta | ..................... H04N 7/181 348/143 |
| 2008/0180519 | A1* | 7/2008 | Cok | ......................... H04N 7/15 348/14.02 |
| 2011/0173080 | A1* | 7/2011 | Kutsumi | ............ G06Q 30/0241 705/14.73 |
| 2014/0104582 | A1 | 4/2014 | Mori | |

(Continued)

FOREIGN PATENT DOCUMENTS

| JP | 2014-78872 A | 5/2014 |
| JP | 2015-57689 A | 3/2015 |

*Primary Examiner* — Sahlu Okebato
(74) *Attorney, Agent, or Firm* — Oliff PLC

(57) ABSTRACT

An image display system includes a first image display device and a second image display device. The first image display device includes a first communication section adapted to perform communication with the second image display device, a first display section adapted to display a first image based on first image information, a storage section adapted to store second image information, an operation section adapted to receive a first operation, and a control section adapted to make the first communication section transmit the second image information corresponding to the first operation received by the operation section to the second image display device. The second image display device includes a second communication section adapted to perform communication with the first image display device, and a second display section adapted to display a second image based on the second image information received via the second communication section.

15 Claims, 5 Drawing Sheets

(56) References Cited

U.S. PATENT DOCUMENTS

| | | |
|---|---|---|
| 2015/0042561 A1 | 2/2015 | Kubota et al. |
| 2017/0206053 A1 | 7/2017 | Kubota et al. |
| 2017/0244884 A1* | 8/2017 | Burtey .................. H04N 5/265 |
| 2018/0139427 A1 | 5/2018 | Mori |
| 2019/0130788 A1* | 5/2019 | Seaton .................... G06F 3/014 |

* cited by examiner

IMAGE DISPLAY SYSTEM, IMAGE DISPLAY DEVICE AND METHOD OF CONTROLLING IMAGE DISPLAY SYSTEM

The entire disclosure of Japanese Patent Application No. 2018-032898, filed Feb. 27, 2018 is expressly incorporated by reference herein.

BACKGROUND

1. Technical Field

The present invention relates to an image display system, an image display device and a method of controlling an image display system.

2. Related Art

There is known an image display device for displaying an on-screen display (OSD) image so as to be superimposed on an image presently displayed. In JP-A-2014-78872, there is described a projector for displaying a menu image for performing zoom control and a keystone correction as the OSD image in a superimposed manner. It is possible for the user to adjust a zoom amount and the correction value for the keystone correction by operating a remote controller or the like while looking at the menu image displayed.

However, there is a problem that if an operation of the zoom control, the keystone correction or the like is performed in the presence of a person appreciating an image, the person is hindered by the OSD image superimposed on the image from appreciating the image.

SUMMARY

An advantage of some aspects of the invention is to solve at least a part of the problems described above, and the invention can be implemented as the following aspects or application examples.

Application Example 1

An image display system according to this application example is an image display system including a first image display device and a second image display device, wherein the first image display device includes a first communication section adapted to perform communication with the second image display device, a first display section adapted to display a first image based on first image information, a storage section adapted to store second image information, an operation section adapted to receive a first operation, and a control section adapted to make the first communication section transmit the second image information corresponding to the first operation received by the operation section to the second image display device, and the second image display device includes a second communication section adapted to perform communication with the first image display device, and a second display section adapted to display a second image based on the second image information received via the second communication section.

According to this image display system, since the second image to be displayed in the case in which the first operation has been performed is displayed by the second image display device instead of the first image display device, it is prevented that the second image is superimposed on the first image to thereby hinder the first image from being appreciated in the case in which there is presented a person appreciating the first image displayed by the first image display device.

Application Example 2

In the image display system according to the application example described above, it is desirable that the first image display device further includes a correction section adapted to correct the first image information, the operation section receives a second operation while the second display section is displaying the second image, the correction section corrects the first image information using a correction value generated in accordance with the second operation received by the operation section, and the first display section displays the first image based on the first image information corrected by the correction section.

According to this image display system, since the first image display device receives the second operation with the operation section in the case in which the second display section displays the second image, and is provided with the correction section for correcting the first image information based on the second operation, it becomes possible to perform the correction of the first image without hindering the first image from being appreciated.

Application Example 3

In the image display system according to the application example described above, it is desirable that the second display section displays the second image on a display member having a light transmissive property.

According to this image display system, since the second display section displays the second image on the display member having a light transmissive property, it becomes possible for the user to see the second image while visually recognizing the first image through the display member.

Application Example 4

In the image display system according to the application example described above, it is desirable that the second image display device further includes an image detection section adapted to detect the first image displayed by the first display section, and an image adjustment section adapted to adjust a configuration of the second image displayed by the second display section based on a configuration of the first image detected by the image detection section.

According to this image display system, since the image detection section detects the first image displayed by the first display section, and then the image adjustment section adjusts the configuration of the second image based on the configuration of the first image thus detected, it becomes possible to display the second image in accordance with the configuration of the first image thus detected.

Application Example 5

In the image display system according to the application example described above, it is desirable that the control section makes the first communication section transmit the first image information to the second image display device, and the image detection section detects the first image based on the first image information received via the second communication section.

According to this image display system, since the first image information is transmitted from the first image display device to the second image display device together with the second image information, it becomes possible for the image detection section to easily detect the first image by using the first image information thus transmitted.

Application Example 6

In the image display system according to the application example described above, it is desirable that the second image display device further includes an imaging section, and the image detection section detects the first image based on an image taken by the imaging section.

According to this image display system, since the second image display device is provided with the imaging section, it becomes possible to easily detect the first image.

Application Example 7

An image display device according to this application example is an image display device adapted to display an image, the image display device including a first communication section adapted to perform communication with another image display device, a first display section adapted to display a first image based on first image information, a storage section adapted to store second image information, an operation section adapted to receive a first operation, and a control section adapted to make the first communication section transmit the second image information corresponding to the first operation received by the operation section to the another image display device.

According to this image display device, since the image to be displayed in the case in which the first operation has been performed, namely the second image based on the second image information, is made to be displayed by the another image display device instead of the first display section, it is prevented that the second image is superimposed on the first image to thereby hinder the first image from being appreciated even in the case in which a number of people are appreciating the first image displayed by the first image display device.

Application Example 8

A method of controlling an image display system according to this application example is a method of controlling an image display system including a first image display device and a second image display device, the method including the steps of displaying, by the first image display device, a first image based on first image information, receiving, by the first image display device, a first operation, transmitting, by the first image display device, second image information corresponding to the first operation to the second image display device, receiving, by the second image display device, the second image information, and displaying, by the second image display device, a second image based on the second image information received.

According to this method of controlling an image display system, since the second image to be displayed in the case in which the first operation has been performed is displayed by the second image display device instead of the first image display device, it is prevented that the second image is superimposed on the first image to thereby hinder the appreciation in the case in which there is presented a person appreciating the first image displayed by the first image display device.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An image display system according to the present embodiment will hereinafter be described with reference to the drawings.

Figure 1:
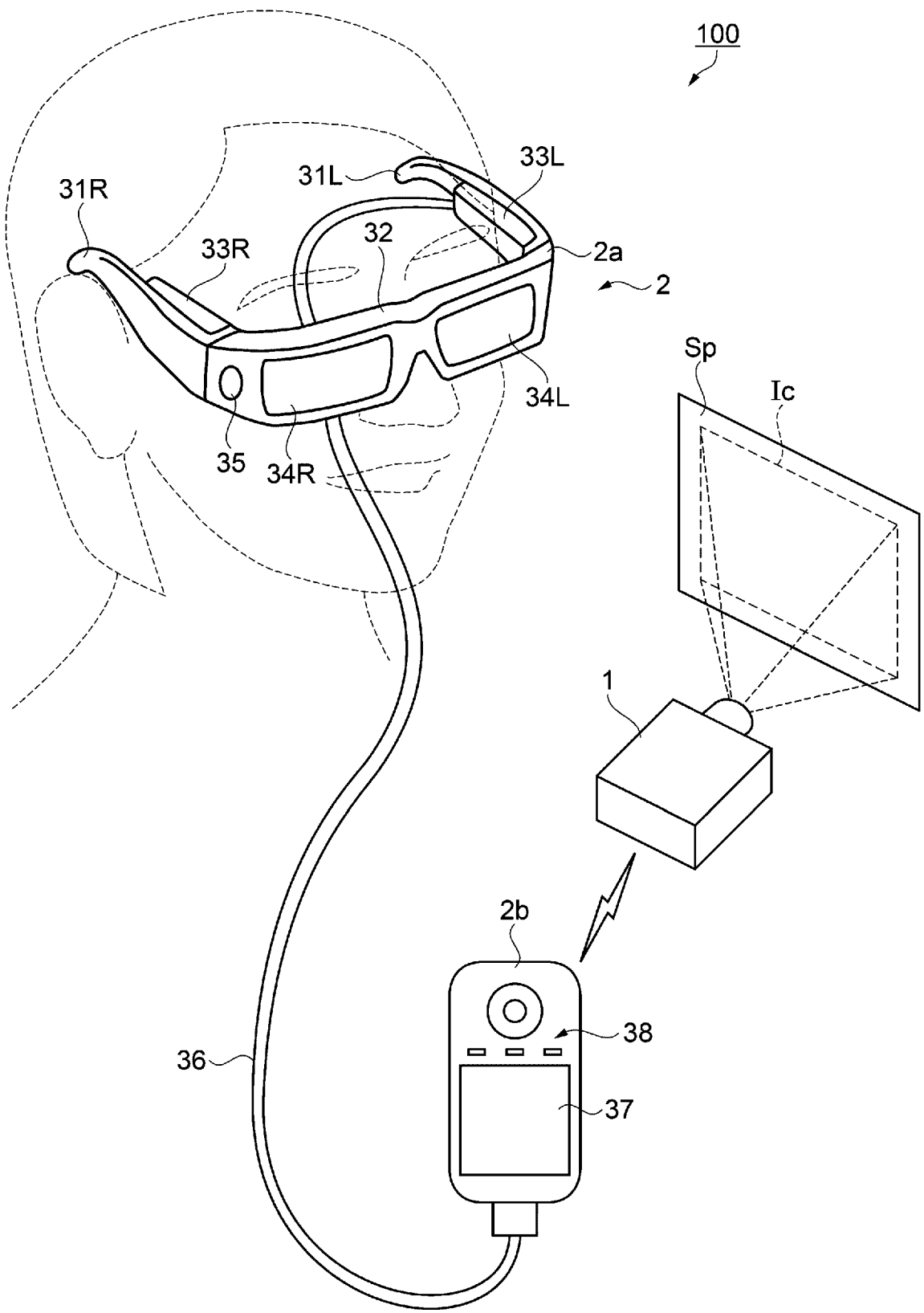
FIG. 1 is an explanatory diagram showing an image display system.

FIG. 1 is an explanatory diagram showing the image display system 100 according to the present embodiment.

As shown in FIG. 1, the image display system 100 is configured including a projector 1 for projecting an image on a projection surface Sp such as a screen or a wall surface, and a head mounted display device (hereinafter also referred to as a "head mounted display (HMD)") 2 to be mounted on the head of a user located at a position from which the projection surface Sp can visually be recognized. Although not shown in FIG. 1, the projector 1 is connected to an image supply device (see FIG. 2) such as an image reproduction device, and projects an image (hereinafter also referred to as a "content image Ic") based on image information supplied on the projection surface Sp in response to the supply of the image information from the image supply device 3. The HMD 2 is a see-through type (transmissive type) image display device provided with a display member having a light transmissive property, and it is possible for the user wearing the HMD 2 to visually recognize the image displayed on the display member, and at the same time, visually recognize the outside view through the display member. Further, the projector 1 and the HMD 2 are connected to each other with wireless communication, and are made capable of performing transmission and reception (communication) of the information with each other. It should be noted that the projector 1 corresponds to a first image display device, and the HMD 2 corresponds to a second image display device.

In the image display system 100 according to the present embodiment, in the case of displaying additional images such as a menu image, a message image, and pattern images for a variety of adjustments based on an operation by the user to the projector 1, it is possible to display only the additional images on the HMD 2 instead of projecting (displaying) these additional images so as to be superimposed on the content image Ic as on-screen display (OSD) image. Thus, it is possible to prevent the additional image (the OSD image) from being superimposed on the content image Ic projected by the projector 1, and it becomes possible to prevent the additional image from hindering the content image Ic from being appreciated.

Figure 2:
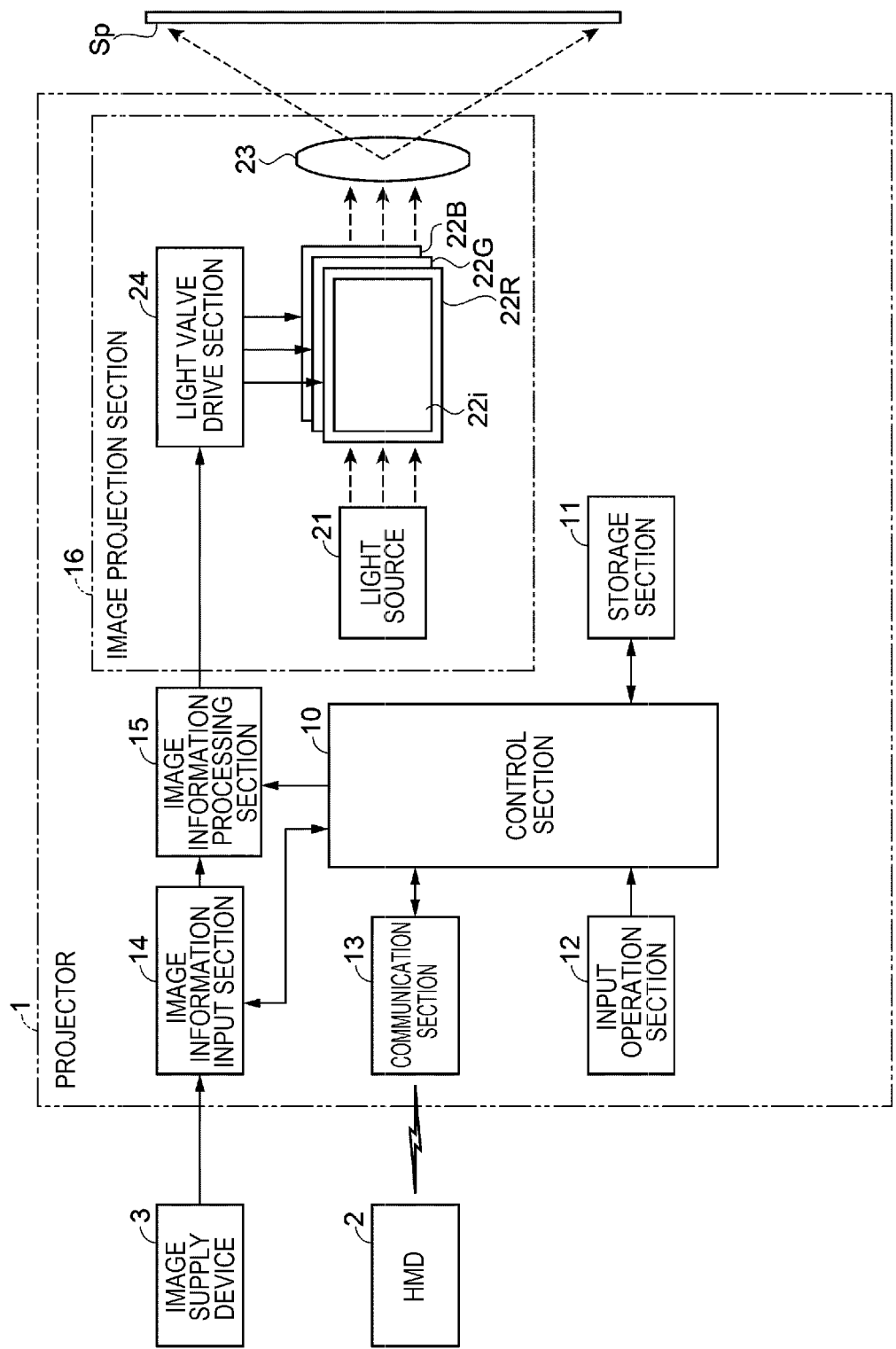
FIG. 2 is a block diagram showing a schematic configuration of the projector.

FIG. 2 is a block diagram showing a schematic configuration of the projector 1.

As shown in FIG. 2, the projector 1 is configured integrally including a control section 10, a storage section 11, an input operation section 12 as an operation section, a communication section 13 as a first communication section, an image information input section 14, an image information processing section 15 as a correction section, and an image projection section 16 as a first display section. The projector 1 projects the content image Ic from the image projection section 16 on the projection surface Sp based on the image information input from the image supply device 3 to the image information input section 14.

The control section 10 is configured including at least one processor, and operates in accordance with a control program stored in the storage section 11 to thereby integrally control the operation of the projector 1.

The storage section 11 is configured including memory devices such as a random access memory (RAM) and a read only memory (ROM). The RAM is used for temporary storage of a variety of types of data, and the ROM stores the control program, control data and so on for controlling the operation of the projector 1. Further, the ROM stores the image information (hereinafter also referred to as "OSD image information") representing the additional image (the OSD image) such as the menu image, the message image and the pattern image.

The input operation section 12 is provided with a plurality of operation keys for the user to provide a variety of instructions to the projector 1 to receive an input operation by the user to the operation keys. As the operation keys provided to the input operation section 12, there are cited a "power key" for switching between ON and OFF (standby) of the power, a "menu key" for displaying the menu image for performing a variety of types of settings, "directional keys" used for selecting items on the menu image and so on, a "determination key" used when deciding the item thus selected, and so on. When the user operates a variety of operation keys of the input operation section 12, the input operation section 12 outputs an operation signal corresponding to the operation content by the user to the control section 10. It should be noted that it is also possible to adopt a configuration of using a remote controller (not shown) capable of a remote operation as the input operation section 12. In this case, the remote controller transmits an operation signal of an infrared ray corresponding to the operation content by the user, and then a remote control signal receiving section not shown receives the operation signal to transmit the operation signal to the control section 10.

The communication section 13 is connected to the HMD 2 wirelessly, and performs the transmission and reception (communication) of the information with the HMD 2 based on the control by the control section 10. The communication section 13 is a wired interface or a wireless interface for performing the communication with the HMD 2. The communication section 13 can be provided with a configuration of being connected to the HMD 2 via a network such as a wireless LAN (local area network). In this case, it is possible for the communication section 13 to perform communication with a variety of devices (e.g., a computer and other projectors) connected to the network. Further, the connection between the communication section 13 and the HMD 2 is not limited to the wireless connection, but can also be connection with wires.

The image information input section 14 is connected to the external image supply device 3 to be supplied with the image information corresponding to the content image Ic from the image supply device 3. Further, it is also possible for the image information input section 14 to be supplied with the image information stored in the storage section 11, and the image information generated by the control section 10 from the control section 10. The image information thus input is output by the image information input section 14 to the image information processing section 15.

Based on the control by the control section 10, the image information processing section 15 performs a variety of types of image processing on the image information input from the image information input section 14, and then outputs the image information having been processed to a light valve drive section 24 of the image projection section 16. For example, the image information processing section 15 performs a process of adjusting the image quality, a process of correcting the shape (distortion) of the image, a process of displaying the OSD image in a superimposed manner, and so on on the image information as needed basis.

In the case of superimposing the OSD image, the control section 10 retrieves necessary OSD image information from the storage section 11, and then outputs the OSD image information to the image information processing section 15 together with position information representing the position to display the OSD information. When the information is input from the control section 10, the image information processing section 15 performs the process of superimposing the additional image (the OSD image) based on the OSD image information at the position represented by the position information. It should be noted that in the case in which the setting of inhibiting the OSD image from being superimposed on the content image Ic has been made by the user as described above, the control section 10 makes the OSD image information be transmitted from the communication section 13 to the HMD 2 to make the HMD 2 display the additional image corresponding to the OSD image instead of making the image information processing section 15 superimpose the OSD image.

It should be noted that the image information input section 14 and the image information processing section 15 can be constituted by at least one processor and so on, or can also be constituted by a dedicated processing device such as an ASIC (application specific integrated circuit) or an FPGA (field programmable gate array).

The image projection section 16 is configured including a light source 21, three liquid crystal light valves 22R, 22G, and 22B as light modulation devices, a projection optical system 23, a light valve drive section 24, and so on. The image projection section 16 modulates the light emitted from the light source 21 with the liquid crystal light valves 22R, 22G, and 22B to thereby form image light, and then projects the image light from the projection optical system 23 including at least one of a lens and a mirror to thereby display the image on the projection surface Sp.

The light source 21 is configured including a discharge type light source lamp such as a super high-pressure mercury lamp or a metal halide lamp, or a solid-state light source such as a light emitting diode or a semiconductor laser. The light emitted from the light source 21 is converted into the light having a substantially uniform intensity distribution by an integrator optical system not shown, and is then separated into colored light components of red (R), green (G), and blue (B), the three primary colors of light, by a color separation optical system not shown, and then the colored light components enter the liquid crystal light valves 22R, 22G, and 22B, respectively.

The liquid crystal light valves 22R, 22G, and 22B are each formed of a transmissive liquid crystal panel having a liquid crystal material encapsulated between a pair of transparent substrates, and so on. The liquid crystal panels are each provided with a rectangular pixel area 22i constituted by a plurality of pixels arranged in a matrix, and are each arranged so that a drive voltage can be applied to the liquid crystal material pixel by pixel.

The light valve drive section 24 forms an image in the pixel area 22i of each of the liquid crystal light valves 22R, 22G and 22B. Specifically, the light valve drive section 24 applies the drive voltages corresponding to the image information input from the image information processing section 15 to the respective pixels in the pixel area 22i to thereby set the pixels to respective light transmittances corresponding to the image information. The light emitted from the light source device 21 is transmitted through the pixel area 22i of each of the liquid crystal light valves 22R, 22G and 22B to thereby be modulated pixel by pixel, and thus the image light corresponding to the image information is formed for each of the colored light beams. The colored light beams as the image light of the respective colors thus formed are combined pixel by pixel by a color composition optical system not shown to turn to the image light representing a color image, and the image light is then projected on the projection surface Sp by the projection optical system 23 in an enlarged manner. As a result, on the projection surface Sp, there is displayed an image based on the image information input to the image information input section 14.

Going back to FIG. 1, the HMD 2 is provided with a head mount section 2a to be mounted on the head of the user, and a control device (a controller) 2b held by the user.

The head mount section 2a is shaped like eyeglasses in the present embodiment. The head mount section 2a is provided with a right display unit 33R, a left display unit 33L, a right light guide plate 34R, and a left light guide plate 34L in a main body having a right holding part 31R, a left holding part 31L, and a front frame 32.

The right holding part 31R and the left holding part 31L are members for holding the front frame 32, and respectively extend backward from both of right and left ends of the front frame 32 and are disposed on the temporal regions of the user like the temples of the eyeglasses.

The right light guide plate 34R and the left light guide plate 34L are each a display member having a light transmissive property, and are fixed to the front frame 32. The right light guide plate 34R is located in front of the right eye of the user wearing the head mount section 2a, and allows the right eye of the user to visually recognize the image. The left light guide plate 34L is located in front of the left eye of the user wearing the head mount section 2a, and allows the left eye of the user to visually recognize the image.

The front frame 32 is configured so as to connect one end of the right light guide plate 34R and one end of the left light guide plate 34L to each other. The position where the one ends are connected to each other corresponds to a position of the glabella of the user wearing the head mount section 2a. The front frame 32 can also be provided with a nose pad having contact with the nose of the user wearing the head mount section 2a at the position where the right light guide plate 34R and the left light guide plate 34L are connected to each other. In this case, it is possible to fix the head mount section 2a to the head of the user with the nose pad, the right holding part 31R, and the left holding part 31L. Further, a belt having contact with the back of the head of the user wearing the head mount section 2a can also be connected to the right holding part 31R and the left holding part 31L. In this case, it is possible to firmly fix the head mount section 2a to the head of the user with the belt.

The right display unit 33R performs the display of the image to the right light guide plate 34R. The right display unit 33R is disposed in the right holding part 31R, and is located in the vicinity of the right temporal region of the user wearing the head mount section 2a. The left display unit 33L performs the display of the image to the left light guide plate 34L. The left display unit 33L is disposed in the left holding part 31L, and is located in the vicinity of the left temporal region of the user wearing the head mount section 2a. It should be noted that the right display unit 33R and the left display unit 33L are also collectively referred to as "display units 33 (see FIG. 3)." The display units 33 correspond to a second display section.

The right light guide plate 34R and the left light guide plate 34L in the present embodiment are optical members (e.g., prisms) formed of light transmissive resin or the like, and respectively guide the image light output by the right display unit 33R and the left display unit 33L to the eyes of the user. It should be noted that it is possible for a dimming plate to be disposed on a surface of each of the right light guide plate 34R and the left light guide plate 34L. The dimming plate is an optical element having a thin-plate like shape different in transmittance in accordance with the wavelength band of the light, and functions as a so-called wavelength filter. The dimming plate is disposed so as to cover, for example, an obverse surface (a surface on the opposite side to the surface opposed to the eyes of the user) of the front frame 32. By appropriately selecting the optical characteristics of the dimming plate, it is possible to control the transmittance of the light in an arbitrary wavelength band such as visible light, infrared light, or ultraviolet light, and it is possible to control the light intensity of the outside light entering from the outside and is then transmitted through the right light guide plate 34R and the left light guide plate 34L.

The head mount section 2a guides the image light respectively generated by the right display unit 33R and the left display unit 33L to the right light guide plate 34R and the left light guide plate 34L, to allow the user to visually recognize the image with the image light. In other words, the right display unit 33R and the left display unit 33L respectively display the image on the right light guide plate 34R and the left light guide plate 34L so that the user can visually recognize the image. Since the right light guide plate 34R and the left light guide plate 34L each have a light transmissive property, the outside light enters the eyes of the user together with the image light forming the image. In other words, both of the image displayed on the right light guide plate 34R and the left light guide plate 34L and the outside view enter the field of view of the user at the same time.

An imaging section 35 is disposed on the front frame 32 of the head mount section 2a. The imaging section 35 is disposed at a position where the imaging section 35 does not block the outside light transmitted through the right light guide plate 34R and the left light guide plate 34L in the front surface of the front frame 32. In the example shown in FIG. 1, the imaging section 35 is disposed on the right end part of the front frame 32. It is also possible for the imaging section 35 to be disposed on the left end part of the front frame 32, or disposed in a connection part between the right light guide plate 34R and the left light guide plate 34L.

The imaging section 35 is a camera provided with an imaging element such as a CCD (charge coupled device) sensor or a CMOS (complementary metal oxide semiconductor) sensor, an imaging lens and so on. The imaging section 35 in the present embodiment is a monocular camera, but it is also possible to adopt a stereo camera. The imaging section 35 takes an image of at least a part of the outside view (a real space) in the obverse side direction of the HMD 2, namely in the view field direction visually recognized by the user wearing the head mount section 2a. In other words, the imaging section 35 takes an image of the range overlapping the field of view of the user, namely in the direction to be visually recognized by the user. The width of the field angle of the imaging section 35 can arbitrarily be set. In the present embodiment, the width of the field angle of the imaging section 35 is set so as to image at least the range which can be visually recognized by user through the right light guide plate 34R and the left light guide plate 34L.

The head mount section 2a and the control device 2b are connected to each other with a connection cable 36. One end of the connection cable 36 is detachably connected to a connector disposed in a lower part of the control device 2b, and the other end of the connection cable 36 is inserted from the left display unit 33L into the head mount section 2a and then connected to a variety of circuits.

The control device 2b is a device for controlling an operation of the HMD 2. On the surface of the control device 2b, there are disposed a touch pad 37 and a plurality of operation keys 38. The touch pad 37 has an operation surface for detecting contact with a finger of the user, and a motion of the finger having contact with the operation surface to receive the operation to the operation surface with the finger of the user. The detection system of the finger on the operation surface is not particularly limited, but there can be adopted an electrostatic type, a pressure detection type, an optical type, and so on. The operation keys 38 receive a pressing operation by the user.

Figure 3:
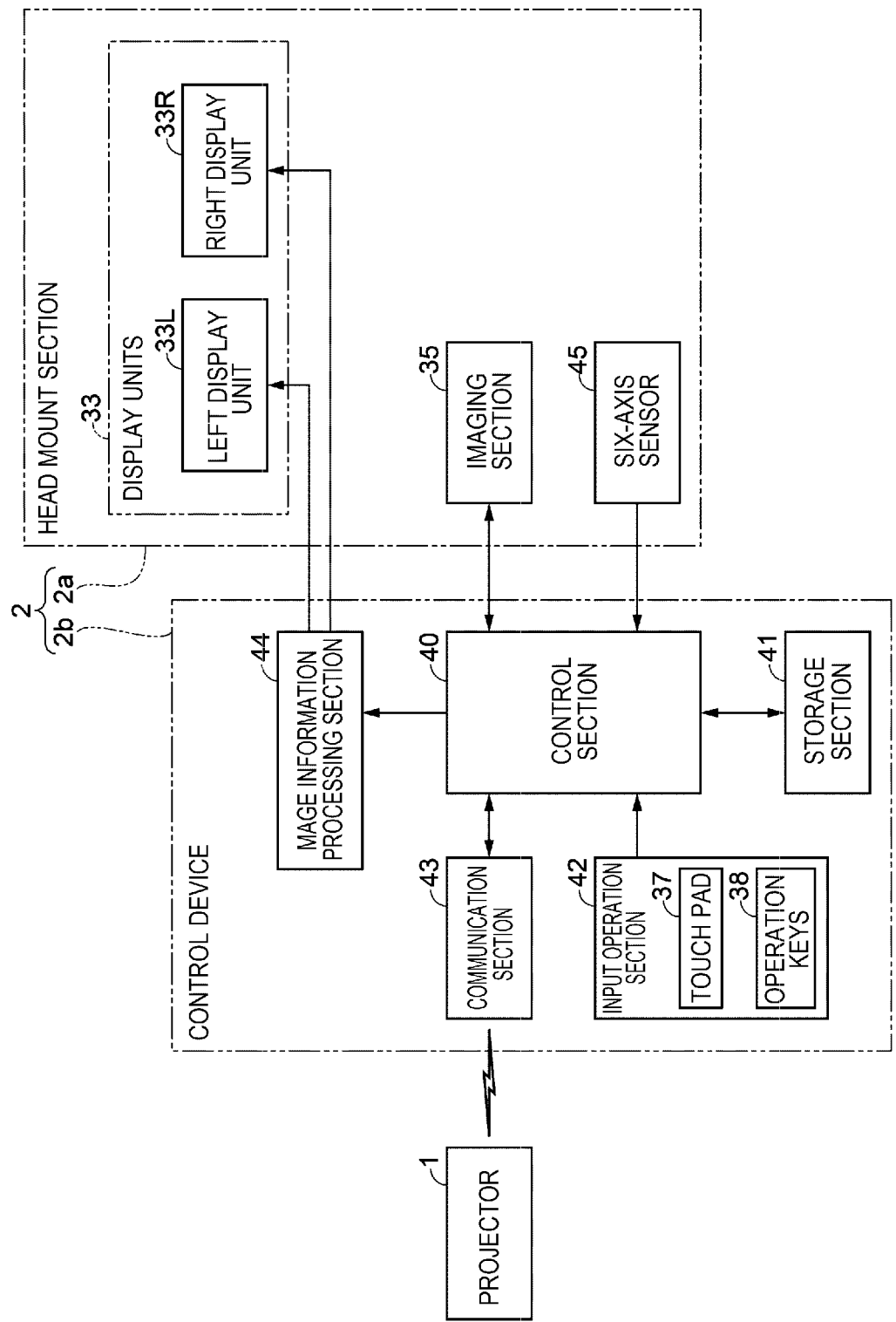
FIG. 3 is a block diagram showing a schematic configuration of an HMD.

FIG. 3 is a block diagram showing a schematic configuration of the HMD 2.

As shown in FIG. 3, the control device 2b of the HMD 2 is configured including a control section 40, a storage section 41, an input operation section 42, a communication section 43 as a second communication section, and an image information processing section 44.

The control section 40 is configured including at least one processor, and operates in accordance with a control program stored in the storage section 41 to thereby integrally control the operation of the HMD 2.

The storage section 41 is configured including memory devices such as a RAM and a ROM. The RAM is used for temporary storage of a variety of types of data, and the ROM stores the control program, control data and so on for controlling the operation of the HMD 2.

The input operation section 42 is configured including the touch pad 37 and the plurality of operation keys 38 to receive the input operation by the user to the touch pad 37 and the operation keys 38. When the user operates the input operation section 42 (the touch pad 37 and the operation keys 38), the input operation section 42 outputs an operation signal corresponding to the operation content by the user to the control section 40.

The communication section 43 is connected wirelessly to the projector 1, and performs the transmission and reception (communication) of the information with the projector 1 based on the control by the control section 40. The communication section 43 is a wired interface or a wireless interface for performing the communication with the projector 1. The communication section 43 can be provided with a configuration of being connected to the projector 1 via a network such as a wireless LAN. In this case, it is possible for the communication section 43 to perform communication with a variety of devices (e.g., a computer and other HMD) connected to the network. Further, the connection between the communication section 43 and the projector 1 is not limited to the wireless connection, but can also be connection with wires.

The image information processing section 44 performs image processing such as image quality control on the image information input from the control section 40 based on the control by the control section 40, and then outputs the image information having been processed to the display units 33 (the right display unit 33R and the left display unit 33L) of the head mount section 2a. It should be noted that the image information processing section 44 can be constituted by at least one processor and so on, or can also be constituted by a dedicated processing device such as an ASIC or an FPGA.

The head mount section 2a of the HMD 2 has the display units 33, the imaging section 35 and a six-axis sensor 45.

The display units 33 are configured including the right display unit 33R and the left display unit 33L. The right display unit 33R and the left display unit 33L each have an OLED (organic light emitting diode) panel not shown, generate the image light based on the image information input from the image information processing section 44 using the OLED panels, and then guide the image light respectively to the right light guide plate 34R and the left light guide plate 34L. It should be noted that the right display unit 33R and the left display unit 33L are not limited to the configuration provided with the OLED panel. For example, it is also possible to adopt a configuration of modulating the light emitted from the light source with a liquid crystal panel to generate the image light.

The imaging section 35 performs imaging in accordance with the control by the control section 40 to output the image information (hereinafter also referred to as "taken image information") corresponding to the image (hereinafter also referred to as a "taken image") thus taken to the control section 40.

The six-axis sensor 45 is a motion sensor (an inertial sensor) provided with a triaxial acceleration sensor and a triaxial gyro (angular velocity) sensor, and detects the motion of the head of the user wearing the head mount section 2a. As the six-axis sensor 45, it is possible to adopt an IMU (inertial measurement unit) having the sensors described above modularized. It is possible for the six-axis sensor 45 to be arranged to output the detected values to the control section 40 with a predetermined sampling frequency, or to output the detected values in accordance with an instruction from the control section 40. It should be noted that it is also possible for the head mount section 2a to be provided with a magnetic sensor, a GPS (global positioning system) receiver, and so on besides the six-axis sensor 45.

Then, an operation of the image display system 100 will be described.

It is possible for the user to perform a variety of settings related to the operation of the projector 1 by operating the input operation section 12 of the projector 1. As one of the settings, it is possible for the user to switch between an operation mode for enabling the display of the OSD image and an operation mode for inhibiting the display of the OSD image.

In the case in which the operation mode of the projector 1 is set to the mode for enabling the display of the OSD image, the OSD image is displayed by the projector 1 so as to be superimposed on the content image Ic. For example, in the operation mode for enabling the display of the OSD image, when the menu key of the input operation section 12 is operated by the user, the control section 10 instructs the image information processing section 15 to superimpose the menu image on the content image Ic as the OSD image. As a result, the image having the menu image superimposed on the content image Ic is projected from the image projection section 16.

In contrast, when the menu key is operated by the user in the case in which the operation mode of the projector 1 is set to the mode for inhibiting the display of the OSD image, the control section 10 does not instruct the image information processing section 15 to superimpose the menu image, but retrieves the OSD image information corresponding to the menu image from the storage section 11, and then makes the communication section 13 transmit the OSD image information to the HMD 2. Then, by the control section 40 of the HMD 2 outputting the OSD image information having been received by the communication section 43 to the image information processing section 44, the menu image is displayed on the display members (the right light guide plate 34R and the left light guide plate 34L) of the HMD 2. In other words, in this case, only the user wearing the HMD 2 can visually recognize the menu image, and the user is allowed to perform the operation (the menu operation) on the menu image by operating the input operation section 12 while looking at the menu image displayed on the HMD 2. In contrast, the menu image is not visually recognized by other users not wearing the HMD 2, and thus, the case in which the content image Ic is hindered from being appreciated is prevented.

Further, the projector 1 according to the present embodiment is arranged to be able to execute a point correction process for correcting the distortion of the image caused by unevenness of the projection surface Sp and so on.

Figure 4A:
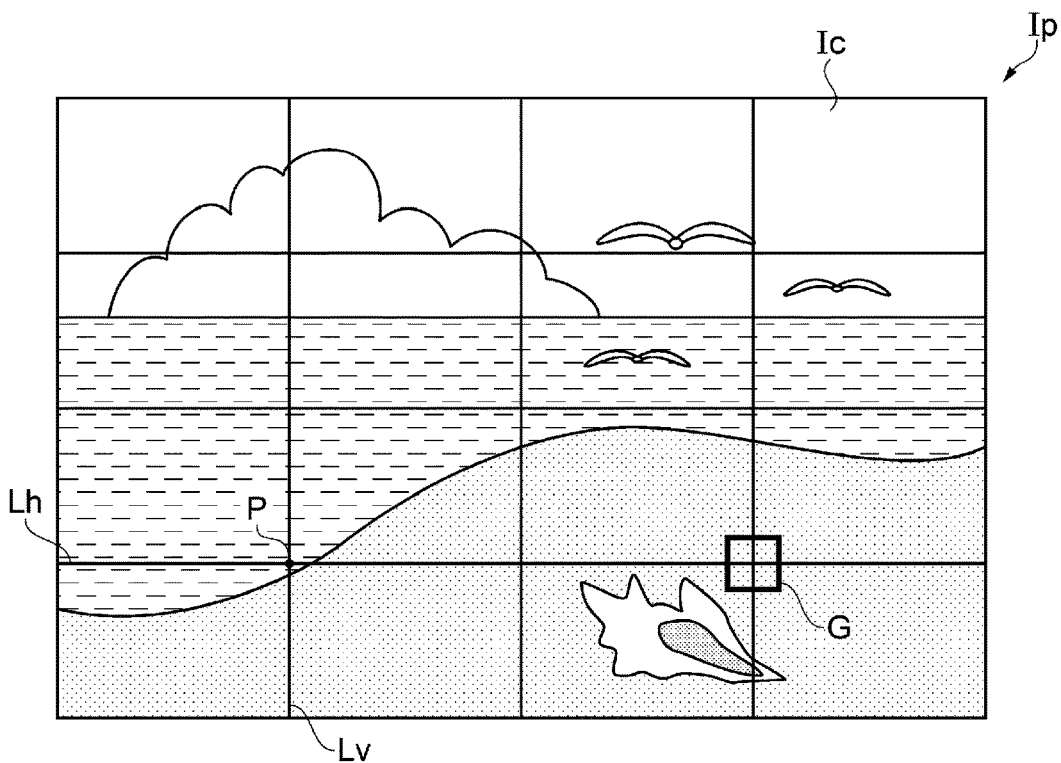
FIG. 4A is an explanatory diagram for explaining a point correction process.
Figure 4B:
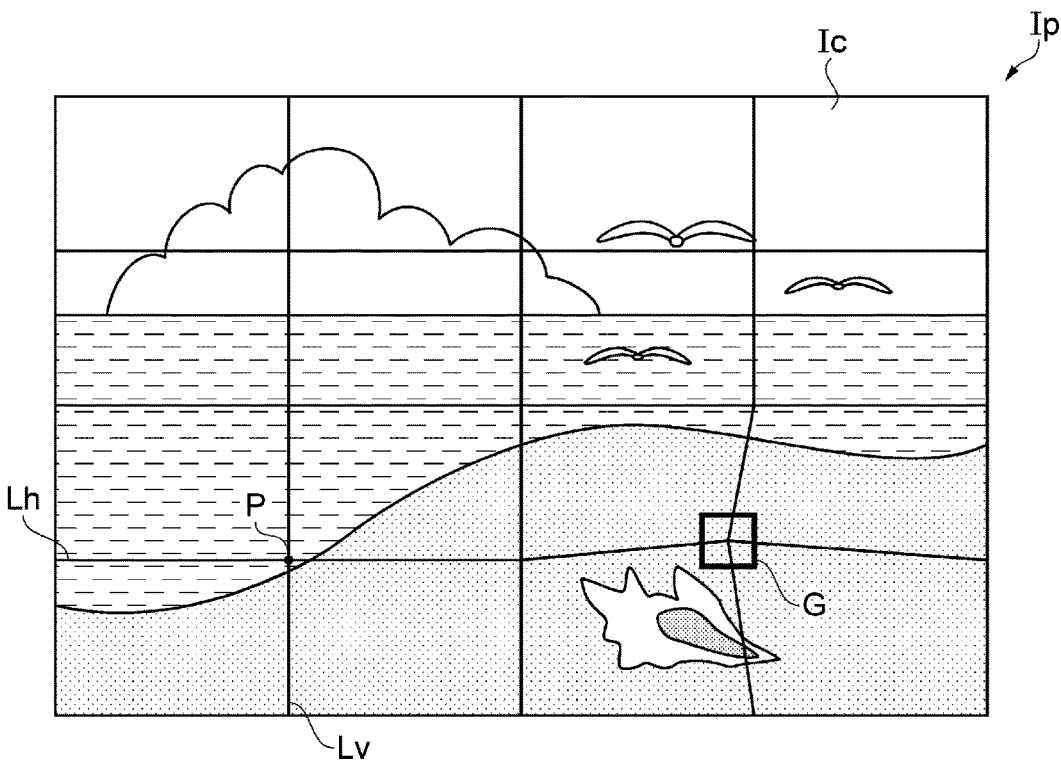
FIG. 4B is an explanatory diagram for explaining the point correction process.

FIG. 4A and FIG. 4B are explanatory diagrams for explaining the point correction process.

As shown in FIG. 4A, in the operation mode for enabling the display of the OSD image, when the operation of instructing the execution of the point correction process is performed by the user on input operation section 12, the control section 10 instructs the image information processing section 15 to superimpose a lattice pattern image (a lattice pattern Ip) on the content image Ic as the OSD image. The lattice pattern Ip is a pattern image configured including a plurality of vertical lines Lv and a plurality of horizontal lines Lh, and sectioning the content image Ic into a plurality of rectangular areas. One of the plurality of intersections (hereinafter also referred to as "points P") where the vertical lines Lv and the horizontal lines Lh cross each other is provided with a rectangular guide mark G which represents that the present point P is the point P of the correction target.

In the state in which the lattice pattern Ip is displayed, it is possible for the user to move the guide mark G to select the point P of the correction target by operating the directional keys in the input operation section 12. By operating the determination key in the state of selecting the desired point P, namely the state of locating the guide mark G at the desired point P, it is possible for the user to determine the point P as the point P of the correction target. As shown in FIG. 4B, when the point P of the correction target is determined, it is possible for the user to move (adjust) the position of the point P of the correction target attached with the guide mark G in a desired direction as much as the desired amount by operating the directional keys in the input operation section 12. When the adjustment of the position is completed with respect to one of the points P, it is possible for the user to subsequently perform the adjustment of the position with respect to another of the points P, and when performing an operation of instructing the termination of the process after ending all of the necessary adjustments, the point correction process is terminated. Subsequently, the control section 10 generates a correction parameter (a correction value) for correcting the image information based on the positions of the points P after the adjustment. Then, the control section 10 instructs the image information processing section 15 to start the correction based on the correction parameter thus generated on the image information thereafter input. Thus, the content image Ic is projected in the state in which the distortion of the image due to the unevenness of the projection surface Sp and so on is corrected.

In contrast, in the operation mode for inhibiting the display of the OSD image, when the operation of instructing the execution of the point correction process is performed by the user on the input operation section 12, the lattice pattern Ip is displayed on the HMD 2. In this case, if there exists misalignment in the position, the shape, the size and so on between the content image Ic projected from the projector 1 and the lattice pattern Ip displayed on the HMD 2, it becomes difficult to appropriately perform the operation for the correction. Therefore, in the present embodiment, it is possible to adjust the position, the shape and the size of the lattice pattern Ip displayed on the HMD 2 in accordance with the position, the shape and the size of the content image Ic visually recognized by the user wearing the HMD 2.

Figure 5:
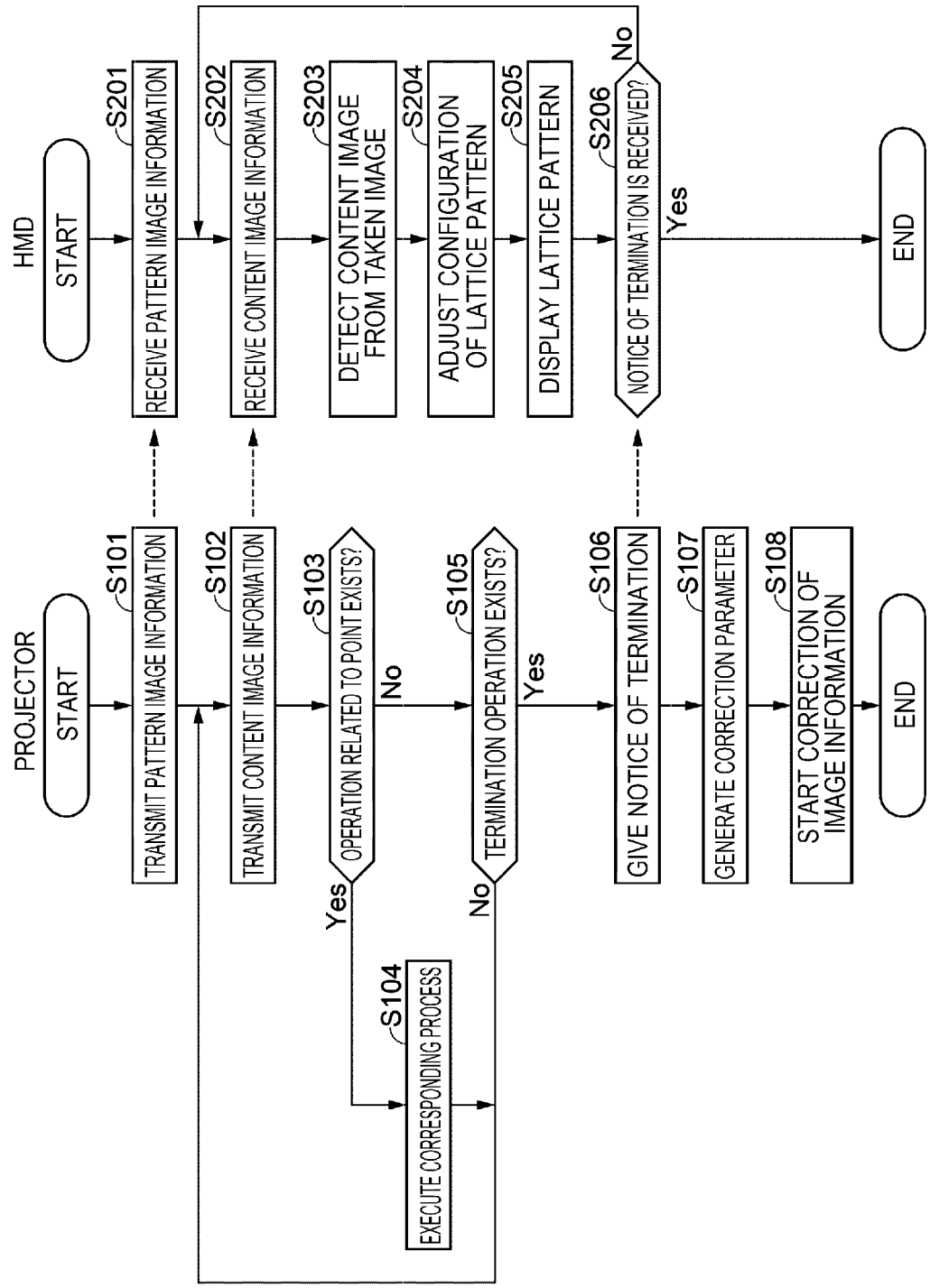
FIG. 5 is a flowchart showing an operation of the image display system in the case in which the execution of the point correction process is instructed in an operation mode for inhibiting display of an OSD image.

FIG. 5 is a flowchart showing an operation of the image display system 100 in the case in which the execution of the point correction process is instructed in the operation mode for inhibiting the display of the OSD image. Here, the steps S101 through S108 represent the operation of the projector 1, and the steps S201 through S206 represent the operation of the HMD 2.

Firstly, in the step S101, the control section 10 of the projector 1 retrieves the OSD image information (hereinafter also referred to as "pattern image information") corresponding to the lattice pattern Ip from the storage section 11, and then makes the communication section 13 transmit the image information to the HMD 2.

Then, in the step S102, the control section 10 obtains the image information input from the image supply device 3 to the image information input section 14, namely the image information (hereinafter also referred to as "content image information") corresponding to the content image Ic, from the image information input section 14, and then makes the communication section 13 transmit the image information to the HMD 2. Here, although the image information is sequentially input frame by frame from the image supply device 3 to the image information input section 14, the control section 10 obtains the image information of the frame input to the image information input section 14 at that time point, and then transmits the image information to the HMD 2. It should be noted that the content image information to be transmitted to the HMD 2 is used for detecting the content image Ic from among the image taken by the imaging section 35 of the HMD 2.

In the step S103, the control section 10 determines whether or not an operation related to the point P such as the operation of selecting the point P or the operation of adjusting the position of the point P has been made to the input operation section 12. Then, the control section 10 makes the transition of the process to the step S104 in the case in which the operation related to the point P has been made, or makes the transition of the process to the step S105 in the case in which the operation related to the point P has not been made.

In the case in which the transition of the process to the step S104 has been made, the control section 10 performs the process corresponding to the input operation such as the process of selecting the point P or the process of moving the point P based on the input operation having been performed on the input operation section 12, and then returns the process to the step S102.

In contrast, in the case in which the transition of the process to the step S105 has been made, the control section 10 determines whether or not the operation (the termination operation) of instructing the termination of the point correction process has been performed by the user on the input operation section 12. Then, the control section 10 makes the transition of the process to the step S106 in the case in which the termination operation has been performed, or returns the process to the step S102 in the case in which the termination operation has not been performed.

In the case in which the transition of the process to the step S106 has been made, the control section 10 notifies the HMD 2 of the fact that the point correction process has been terminated from the communication section 13. Then, in the step S107, the control section 10 generates the correction parameter (the correction value) for correcting the image information based on the positions of the points P after the adjustment. Subsequently, in the step S108, the control section 10 instructs the image information processing section 15 to start the correction based on the correction parameter thus generated on the image information thereafter input, and then terminates the flow. Thus, the content image Ic is projected in the state in which the distortion of the image due to the unevenness of the projection surface Sp and so on is corrected.

Then, the operation of the HMD 2 will be described.

In the step S201, the communication section 43 of the HMD 2 receives the pattern image information transmitted from the projector 1 in the step S101. Then, in the step S202, the communication section 43 receives the content image information transmitted from the projector 1 in the step S102.

In the step S203, the control section 40 of the HMD 2 makes the imaging section 35 perform imaging, and then detects an image based on the content image information received, namely the content image Ic projected from the projector 1 on the projection surface Sp from the taken images thus taken by the imaging section 35.

In the step S204, the configuration (the position, the shape and the size) of the lattice pattern Ip based on the pattern image information having been received in the step S201 is adjusted by the control section 40 based on the configuration (the position, the shape and the size) of the content image Ic detected in the taken image. Specifically, the control section 40 adjusts the pattern image information thus received so that the lattice pattern Ip is superimposed on the content image Ic and the outer shapes of the lattice pattern Ip and the content image Ic seem to coincide with each other when viewed from the user wearing the HMD 2.

Then, in the step S205, the control section 40 outputs the pattern image information thus adjusted to the image information processing section 44 to make the display units 33 display the lattice pattern Ip on the right light guide plate 34R and the left light guide pattern 34L. As a result, the lattice pattern Ip is visually recognized by the user wearing the HMD 2 so as to be superimposed on the content image Ic visually recognized through the right light guide plate 34R and the left light guide plate 34L. In other words, the lattice pattern Ip is visually recognized in the state of being deformed so as to coincide in the outer shape with the content image Ic.

In the step S206, the control section 40 determines whether or not the notice representing the fact that the point correction process has been terminated has been received by the communication section 43. Then, the control section 40 returns the process to the step S202 in the case in which the notice has not been received, or terminates the flow in the case in which the notice has been received.

As described hereinabove, according to the image display system 100, the projector 1 and the method of controlling these related to the present embodiment, the following advantages can be obtained.

(1) According to the present embodiment, it is possible to display the additional image such as the menu image or the pattern image on the HMD 2 instead of displaying the additional image by the projector 1 so as to be superimposed on the content image Ic as the OSD image. Therefore, in the case in which there is presented a person appreciating the content image Ic displayed by the projector 1, it is prevented that the additional image (the OSD image) is superimposed on the content image Ic to hinder the content image Ic from being appreciated.

(2) According to the present embodiment, the input operation section 12 of the projector 1 receives the operation of adjusting the position of the point P when the lattice pattern Ip is displayed on the HMD 2, and the image information processing section 15 corrects the image information based on the correction parameter generated in accordance with the operation. Therefore, it becomes possible to perform the correction of the content image Ic without hindering the content image Ic from being appreciated.

(3) According to the present embodiment, since the display units 33 of the HMD 2 display the lattice pattern Ip on the display members (the right light guide plate 34R and the left light guide plate 34L) having a light transmissive property, it becomes possible for the user to see the lattice pattern Ip while visually recognizing the content image Ic through the display members.

(4) According to the present embodiment, since the control section 40 of the HMD 2 detects the content image Ic from the taken image, and then adjusts the configuration of the lattice pattern Ip to be displayed based on the configuration of the content image Ic thus detected, it becomes possible to display the lattice pattern Ip in accordance with the configuration of the content image Ic thus detected.

(5) According to the present embodiment, since the content image information is transmitted from the projector 1 to the HMD 2 together with the pattern image information representing the lattice pattern Ip, it becomes possible for the HMD 2 to easily detect the content image Ic by using the content image information thus transmitted.

(6) According to the present embodiment, since the HMD 2 is provided with the imaging section 35, it becomes possible to easily detect the content image Ic.

It should be noted that in the embodiment described above, the content image information corresponds to first image information, and the content image Ic based on the content image information corresponds to a first image. Further, the OSD image information corresponds to second image information, and the menu image and the lattice pattern Ip based on the OSD image information correspond to a second image. Further, the operation of the menu key for displaying the menu image, and the operation for instructing the execution of the point correction process correspond to a first operation, and the operation of the directional keys for adjusting the position of the point P in the point correction process corresponds to a second operation. Further, the control section 40 in the case of detecting the content image Ic from the taken image in the step S203 corresponds to an image detection section, and the control section 40 in the case of adjusting the lattice pattern Ip to be displayed in the step S204 corresponds to an image adjustment section.

Modified Examples

Further, the embodiment described above can also be modified as follows.

In the embodiment described above, in the case of superimposing the lattice pattern Ip to be displayed on the HMD 2 on the content image Ic on the projection surface Sp, the misalignment is caused between the lattice pattern Ip and the content image Ic just by a little motion of the user wearing the head mount section 2a. Therefore, in the case of adjusting the configuration of the lattice pattern Ip to be displayed on the HMD 2, it is also possible to take the detection result by the six-axis sensor 45 into consideration.

In the embodiment described above, in the case in which the content image Ic is a dark image, it becomes difficult to detect the content image Ic from the taken image. Therefore, it is also possible for the projector 1 to project the pattern image (the OSD image) for making the detection of the content image Ic easy so as to be superimposed on the content image Ic. It should be noted that it is desirable to use, for example, a frame like image disposed on the circumferential edge of the content image Ic or small marks to be disposed on the four corners of the content image Ic as the pattern image so that the content image Ic is not hindered by the pattern image from being appreciated. Here, it is also possible for the projector 1 to display the pattern image only in the case in which the content image Ic is dark, or to always display the pattern image during the execution of the point correction process. In the latter case, since the HMD 2 can recognize the position, the shape and the size of the content image Ic based on the pattern image alone, it becomes unnecessary to transmit the content image information from the projector 1 to the HMD 2 in the step S102.

In the embodiment described above, the configuration of the lattice pattern Ip to be displayed on the HMD 2 is adjusted based on the configuration of the content image Ic detected from the taken image of the imaging section 35. Therefore, before executing the point correction process, it is desirable to execute a calibration process of making the position on the taken image taken by the imaging section 35 and the position on the additional image to be displayed on the HMD 2 correspond to each other so that the lattice pattern Ip displayed on the HMD 2 is viewed by the user wearing the HMD 2 so as to be superimposed on the content image Ic projected on the projection surface Sp. Here, since the correspondence relationship between the both images changes in accordance with the positional relationship between the eyes of the user and the HMD 2 (the imaging section 35 and the display units 33), it is desirable to execute the calibration process again not only in the case in which the user changes, but also in the case in which the mounting state of the HMD 2 has changed.

Although the example of making the HMD 2 display the menu image and the pattern image is shown in the embodiment described above, the additional image (the OSD image) to be displayed on the HMD 2 is not limited to the above, but can also be, for example, a message image for notifying the user of a message. It should be noted that in the case of displaying the menu image and the message image on the HMD 2, since these images are not required to be superimposed on the content image Ic as required in the case of the lattice pattern Ip, and therefore, it is not required to detect the position and so on of the content image Ic in the HMD 2. Further, in the multiple projection for arranging the images projected from a plurality of projectors 1 to display a single large image, it is also possible to clearly show what image is presently set as the adjustment target with the additional image to be displayed on the HMD 2 in the case of sequentially performing the adjustment of the image for each of the projectors 1.

Although in the embodiment described above, the transmissive liquid crystal light valves 22R, 22G, and 22B are used as the light modulation devices, it is also possible to use reflective light modulation devices such as reflective liquid crystal light valves. Further, it is also possible to use a digital mirror device or the like for modulating the light emitted from the light source 21 by controlling the emission direction of the incident light for every micromirror as a pixel. Further, the configuration of providing the plurality of light modulation devices for the respective colored light beams is not a limitation, but it is also possible to adopt a configuration of modulating the plurality of colored light beams with a single light modulation device in a time-sharing manner.

Although in the embodiment described above, the projector 1 is adopted as the first image display device, the first image display device is not limited to the projector 1, and it is also possible to adopt a different image display device such as a liquid crystal display or an organic EL display.

Although in the embodiment described above, the HMD 2 is adopted as the second image display device, the second image display device is not limited to the HMD 2, and it is also possible to adopt a different image display device such as a liquid crystal display or an organic EL display.

What is claimed is:

1. An image display system comprising:
    a first image display device that displays a first image on a first display screen; and
    a second image display device that is a separate display device from the first image display device and that displays a second image on a second display screen that is a separate display screen from the first display screen,
    wherein the first image display device includes
        a first communication section adapted to perform communication with the second image display device,
        a first display section adapted to display the first image based on first image information,
        a storage section adapted to store second image information,
        an operation section adapted to receive a first operation, the first operation being an operation for instructing execution of an adjustment to the first image, the second image information including on-screen display images each showing the adjustment to the first image, and
        a control section adapted to make the first communication section transmit the second image information corresponding to the first operation received by the operation section to the second image display device, and
    the second image display device includes
        a second communication section adapted to perform communication with the first image display device, and
        a second display section adapted to display a second image based on the second image information received via the second communication section.

2. The image display system according to claim 1, wherein the first image display device further includes a correction section adapted to correct the first image information, the operation section receives a second operation while the second display section is displaying the second image, the correction section corrects the first image information using a correction value generated in accordance with the second operation received by the operation section, and the first display section displays the first image based on the first image information corrected by the correction section.

3. The image display system according to claim 1, wherein the second display section displays the second image on a display member having a light transmissive property.

4. The image display system according to claim 3, wherein the second image display device further includes
an image detection section adapted to detect the first image displayed by the first display section, and
an image adjustment section adapted to adjust a configuration of the second image displayed by the second display section based on a configuration of the first image detected by the image detection section.

5. The image display system according to claim 4, wherein the control section makes the first communication section transmit the first image information to the second image display device, and the image detection section detects the first image based on the first image information received via the second communication section.

6. The image display system according to claim 4, wherein the second image display device further includes an imaging section, and the image detection section detects the first image based on an image taken by the imaging section.

7. An image display device adapted to display an image, comprising:

a first communication section adapted to perform communication with another image display device;

a first display section adapted to display a first image on a first display screen based on first image information;

a storage section adapted to store second image information for a second display section that is a separate display section from the first display section to display a second image on a second display screen that is a separate display screen from the first display screen based on the second image information;

an operation section adapted to receive a first operation, the first operation being an operation for instructing execution of an adjustment to the first image, the second image information including on-screen display images each showing the adjustment to the first image; and a control section adapted to make the first communication section transmit the second image information corresponding to the first operation received by the operation section to the another image display device.

8. A method of controlling an image display system including a first image display device and a second image display device that is a separate display device from the first image display device, the method comprising:

displaying, by the first image display device, a first image on a first display screen based on first image information;

receiving, by the first image display device, a first operation, the first operation being an operation for instructing execution of an adjustment to the first image;

transmitting, by the first image display device, second image information corresponding to the first operation to the second image display device, the second image information including on-screen display images each showing the adjustment to the first image;

receiving, by the second image display device, the second image information; and displaying, by the second image display device, a second image on a second display screen that is a separate display screen from the first display screen based on the second image information received.

9. The method of controlling the image display system according to claim 8, further comprising:

receiving, by the first image display device, a second operation while the second image display device is displaying the second image;

generating, by the first image display device, a correction value in accordance with the second operation;

correcting, by the first image display device, the first image information using the correction value; and displaying, by the first image display device, the first image based on the first image information corrected by the first image display device.

10. The method of controlling the image display system according to claim 8, further comprising:

displaying, by the second image display device, the second image on a display member having a light transmissive property.

11. The method of controlling the image display system according to claim 10, further comprising:

detecting, by the second image display device, the first image displayed by the first image display device; and adjusting a configuration of the second image displayed by the second image display device based on a configuration of the first image detected by the second image display device.

12. The method of controlling the image display system according to claim 11, further comprising:

transmitting the first image information from the first image display device to the second image display device; and detecting, by the second image display device, the first image based on the first image information received.

13. The method of controlling the image display system according to claim 11, wherein the second image display device further includes an imaging section, and the second image display device detects the first image based on an image taken by the imaging section.

14. The image display system according to claim 4, wherein at least one of the on-screen display images represents a lattice pattern, and the image adjustment section is adapted to adjust outer shapes of the lattice pattern based on the configuration of the first image detected by the image detection section.

15. The image display system according to claim 14, wherein the second image display device is a head mounted display, and the image adjustment section is adapted to adjust the outer shapes of the lattice pattern, so that the outer shapes of the lattice pattern and the first image coincide with each other to a user wearing the second image display device when viewed from the user.

* * * * *